US010689474B2

(12) United States Patent
Takada et al.

(10) Patent No.: US 10,689,474 B2
(45) Date of Patent: Jun. 23, 2020

(54) METHOD FOR PRODUCING SEMI-IPN COMPOSITE, AND METHOD FOR PRODUCING SYNTHETIC LEATHER

(71) Applicant: DIC Corporation, Tokyo (JP)

(72) Inventors: Tetsuo Takada, Chiba (JP); Kunihiko Komatsuzaki, Osaka (JP); Kyouichi Toyomura, Tokyo (JP)

(73) Assignee: DIC CORPORATION, Tokyo (JP)

(*) Notice: Subject to any disclaimer, the term of this patent is extended or adjusted under 35 U.S.C. 154(b) by 35 days.

(21) Appl. No.: 15/771,703

(22) PCT Filed: Oct. 20, 2016

(86) PCT No.: PCT/JP2016/081064
§ 371 (c)(1),
(2) Date: Apr. 27, 2018

(87) PCT Pub. No.: WO2017/082010
PCT Pub. Date: May 18, 2017

(65) Prior Publication Data
US 2018/0312620 A1 Nov. 1, 2018

(30) Foreign Application Priority Data
Nov. 11, 2015 (JP) ................. 2015-221297

(51) Int. Cl.
C08F 283/00 (2006.01)
C08F 2/44 (2006.01)
D06N 3/14 (2006.01)

(52) U.S. Cl.
CPC .......... C08F 283/006 (2013.01); C08F 2/44 (2013.01); D06N 3/14 (2013.01); C08L 2205/04 (2013.01)

(58) Field of Classification Search
None
See application file for complete search history.

(56) References Cited

U.S. PATENT DOCUMENTS 5,328,957 A 7/1994 Sorathia et al.
6,436,540 B1 * 8/2002 Garcia ................ C08F 283/006
428/423.1

FOREIGN PATENT DOCUMENTS

| DE | 4315269 A1 | 11/1994 |
|---|---|---|
| JP | 51-82701 A | 7/1976 |
| JP | 59-12789 B2 | 3/1984 |
| JP | 2001-279583 A | 10/2001 |
| JP | 2003-165929 A | 6/2003 |
| JP | 2011-527377 A | 10/2011 |
| JP | 2013-231097 A | 11/2013 |
| JP | 2015-086366 A | 5/2015 |
| WO | 92/14768 A1 | 9/1992 |
| WO | 2010005992 A1 | 1/2010 |

OTHER PUBLICATIONS

Korean Office Action issued in corresponding Korean Patent Application No. 10-2018-7011955, dated Mar. 4, 2019, with English Translation.
Extended European Search Report issued in corresponding European Patent Application No. 16863974.8-1102, dated Jun. 5, 2019.
International Search Report issued in Application No. PCT/JP2016/081064 dated Nov. 29, 2016.

* cited by examiner

Primary Examiner — Satya B Sastri
(74) Attorney, Agent, or Firm — McDermott Will & Emery LLP

(57) ABSTRACT

The present invention relates to a method for producing a semi-IPN composite, the method including polymerizing a hydrophilic monofunctional acrylate (b1) and a polyfunctional acrylate (b2) in a solution of a polyurethane (A) prepared using an aliphatic polyisocyanate and/or an alicyclic polyisocyanate as a raw material. The present invention also relates to a method for producing a synthetic leather that includes a layer obtained by drying the semi-IPN composite obtained by the above production method. One object of the present invention is to provide a method for producing a semi-IPN composite excellent in stain resistance. The semi-INP composite obtained by the production method of the present invention is excellent in stain resistance. Therefore, the semi-IPN composite can be used particularly preferably for skin and topcoat layers of synthetic leathers for vehicles.

3 Claims, No Drawings

METHOD FOR PRODUCING SEMI-IPN COMPOSITE, AND METHOD FOR PRODUCING SYNTHETIC LEATHER

RELATED APPLICATIONS

This application is a national stage of International Application No. PCT/JP2016/081064, filed Oct. 20, 2016, which claims the benefit of Japanese Application No. 2015-221297, filed on Nov. 11, 2015, the disclosures of which are incorporated in their entirety by reference herein.

TECHNICAL FIELD

The present invention relates to a method for producing a semi-IPN composite excellent in stain resistance.

BACKGROUND ART

Polyurethane has good mechanical strength and elasticity, is therefore widely used in various applications such as coating agents, molding materials, paints, and optical films, and is actively studied as materials for synthetic leathers.

Materials for the synthetic leathers are required to have surfaces with high stain resistance (particularly oilproofness). For example, one previously disclosed material for synthetic leathers with stain resistance is a composition prepared by adding a fluorine compound in a polyurethane solution (see, for example, PTL 1).

However, fluorine compounds are expensive, and it has been pointed out that some fluorine compounds influence the human body. Therefore, there is a need for development of a material that provides high stain resistance using no fluorine compound.

CITATION LIST

Patent Literature

PTL 1: Japanese Unexamined Patent Application Publication No. 2001-279583

SUMMARY OF INVENTION

Technical Problem

It is an object of the present invention to provide a method for producing a semi-IPN composite excellent in stain resistance.

Solution to Problem

The present invention relates to a method for producing a semi-IPN composite, the method including polymerizing a hydrophilic monofunctional acrylate (b1) and a polyfunctional acrylate (b2) in a solution of a polyurethane (A) prepared using an aliphatic polyisocyanate and/or an alicyclic polyisocyanate as a raw material.

The present invention also relates to a method for producing a synthetic leather, the synthetic leather having a skin layer and/or a topcoat layer, the skin layer and/or the topcoat layer being formed by drying the semi-IPN composite obtained by the above production method.

Advantageous Effects of Invention

The semi-INP composite obtained by the production method of the present invention is excellent in stain resistance. Therefore, the semi-IPN composite can be used preferably for the skin and topcoat layers of synthetic leathers and can be used particularly preferably for the skin and topcoat layers of synthetic leathers for vehicles.

DESCRIPTION OF EMBODIMENTS

In the semi-IPN composite production method of the present invention, it is essential that a hydrophilic monofunctional acrylate (b1) and a polyfunctional acrylate (b2) be polymerized in a solution of a polyurethane (A) prepared using an aliphatic polyisocyanate and/or an alicyclic polyisocyanate as a raw material.

The semi-IPN (Interpenetrating Polymer Network) composite is a composite having a network structure in which a crosslinked polymer is embedded in a non-crosslinked polymer of a different type. With the above production method, a composite is formed in which the polymer of the hydrophilic monofunctional acrylate (b1) and the polyfunctional acrylate (b2) is entangled with the non-crosslinked polyurethane (A).

It is essential that the polyurethane (A) used be prepared using an aliphatic polyisocyanate and/or an alicyclic polyisocyanate as a raw material. When a polyurethane prepared using an aromatic polyisocyanate as a raw material is used instead of the polyurethane (A), the desired stain resistance cannot be obtained. The reason for this may be that a hydrophilic acrylic component that provides the stain resistance is not segregated on the surface of a film but is uniformly distributed in the film.

Specifically, the polyurethane (A) used is a reaction product of a polyol with an aliphatic polyisocyanate and/or an alicyclic polyisocyanate. In the present invention, the formation of the semi-IPN structure as a result of polymerization of the hydrophilic monofunctional acrylate (b1) and the polyfunctional acrylate (b2) allows the excellent stain resistance to be obtained. Therefore, the type of the polyol can be freely designed according to other physical properties such as durability.

Examples of the polyol that can be used include polyether polyols, polycarbonate polyols, polyester polyols, polyacrylic polyols, polybutadiene polyols, and hydrogenated polybutadiene polyols. These polyols may be used alone or in combination of two or more. In particular, when the semi-IPN composite is used for skin and topcoat layers of synthetic leathers for vehicles, it is preferable to use polycarbonate polyols because of their excellent durability.

The number average molecular weight of the polyol can be appropriately determined within the range of 500 to 8,000 according to the intended physical properties. The number average molecular weight of the polyol is a value measured by gel permeation chromatography (GPC) under the following conditions.

Measurement device: High performance GPC ("HLC-8220GPC" manufactured by TOSOH Corporation)

Columns: The following columns manufactured by TOSOH Corporation and connected in series are used.
"TSKgel G5000" (7.8 mm I.D.×30 cm)×1
"TSKgel G4000" (7.8 mm I.D.×30 cm)×1
"TSKgel G3000" (7.8 mm I.D.×30 cm)×1
"TSKgel G2000" (7.8 mm I.D.×30 cm)×1

Detector: RI (refractive index detector)
Column temperature: 40° C.
Eluent: Tetrahydrofuran (THF)
Flow rate: 1.0 mL/minute
Injection amount: 100 µL (tetrahydrofuran solution with a sample concentration of 0.4% by mass)
Standard samples: The following polystyrene standards are used to produce a calibration curve.

(Polystyrene Standards)

"TSKgel standard polystyrene A-500" manufactured by TOSOH Corporation

"TSKgel standard polystyrene A-1000" manufactured by TOSOH Corporation

"TSKgel standard polystyrene A-2500" manufactured by TOSOH Corporation

"TSKgel standard polystyrene A-5000" manufactured by TOSOH Corporation

"TSKgel standard polystyrene F-1" manufactured by TOSOH Corporation

"TSKgel standard polystyrene F-2" manufactured by TOSOH Corporation

"TSKgel standard polystyrene F-4" manufactured by TOSOH Corporation

"TSKgel standard polystyrene F-10" manufactured by TOSOH Corporation

"TSKgel standard polystyrene F-20" manufactured by TOSOH Corporation

"TSKgel standard polystyrene F-40" manufactured by TOSOH Corporation

"TSKgel standard polystyrene F-80" manufactured by TOSOH Corporation

"TSKgel standard polystyrene F-128" manufactured by TOSOH Corporation

"TSKgel standard polystyrene F-288" manufactured by TOSOH Corporation

"TSKgel standard polystyrene F-550" manufactured by TOSOH Corporation

If necessary, a chain extension agent having a number average molecular weight within the range of 50 to 450 may be used in combination with the polyol. The number average molecular weight of the chain extension agent is a value that is measured in the same manner as that for the number average molecular weight of the polyol.

Examples of the chain extension agent that can be used include: chain extension agents having a hydroxyl group such as ethylene glycol, diethylene glycol, triethylene glycol, propylene glycol, 1,3-propanediol, 1,3-butanediol, 1,4-butanediol, hexamethylene lycol, saccharose, methylene glycol, glycerin, sorbito, bisphenol A, 4,4'-dihydroxydiphenyl, 4,4'-dihydroxydiphenyl ether, 4,4'-dihydroxydiphenyl sulfone, hydrogenated bisphenol A, and hydroquinone; and chain extension agents having an amino group such as ethylenediamine, 1,2-propanediamine, 1,6-hexamethylenediamine, piperazine, 2-methylpiperazine, 2,5-dimethylpiperazine, isophoronediamine, 4,4'-dicyclohexylmethanediamine, 3,3'-dimethyl-4,4'-dicyclohexylmethanediamine, 1,2-cyclohexanediamine, 1,4-cyclohexanediamine, aminoethylethanolamine, hydrazine, diethylenetriamine, and triethylenetetramine. These chain extension agents may be used alone or in combination of two or more.

From the viewpoint of mechanical strength and texture, the amount of the chain extension agent used is preferably within the range of 0.1 to 30 parts by mass based on 100 parts by mass of the polyol.

Examples of the aliphatic polyisocyanate that can be used include tetramethylene diisocyanate, 1,6-hexamethylene diisocyanate, dodecamethylene diisocyanate, and trimethylhexamethylene diisocyanate. These polyisocyanates may be used alone or in combination of two or more.

Examples of the alicyclic polyisocyanate that can be used include 1,3-cyclopentylene diisocyanate, 1,3-cyclohexylene diisocyanate, 1,4-cyclohexylene diisocyanate, 1,3-di(isocyanatomethyl)cyclohexane, 1,4-di(isocyanatomethyl)cyclohexane, lysine diisocyanate, isophorone diisocyanate, 4,4'-dicyclohexylmethane diisocyanate, 2,4'-dicyclohexylmethane diisocyanate, 2,2'-dicyclohexylmethane diisocyanate, and 3,3'-dimethyl-4,4'-dicyclohexylmethane diisocyanate. These polyisocyanates may be used alone or in combination of two or more.

If necessary, an additional polyisocyanate may be used in combination with the aliphatic polyisocyanate and/or the alicyclic polyisocyanate. In this case, the content of the aliphatic and alicyclic polyisocyanates is preferably 50% by mass or more, more preferably 80% by mass or more, and still more preferably 90% by mass or more based on the total mass of the polyisocyanates used.

Examples of the additional polyisocyanate that can be used include 1,3-phenylene diisocyanate, 1,4-phenylene diisocyanate, 1-methyl-2,4-phenylene diisocyanate, 1-methyl-2,6-phenylene diisocyanate, 1-methyl-2,5-phenylene diisocyanate, 1-methyl-3,5-phenylene diisocyanate, 1-ethyl-2,4-phenylene diisocyanate, 1-isopropyl-2,4-phenylene diisocyanate, 1,3-dimethyl-2,4-phenylene diisocyanate, 1,3-dimethyl-4,6-phenylene diisocyanate, 1,4-dimethyl-2,5-phenylene diisocyanate, diethylbenzene diisocyanate, diisopropyibenzene diisocyanate, 1-methyl-3,5-diethylbenzene diisocyanate, 3-methyl-1,5-diethylbenzene-2,4-diisocyanate, 1,3,5-triethylbenzene-2,4-diisocyanate, naphthalene-1,4-diisocyanate, naphthalene-1,5-diisocyanate, 1-methyl-naphthalene-1,5-diisocyanate, naphthalene-2,6-diisocyanate, naphthalene-2,7-diisocyanate, 1,1-dinaphthyl-2,2'-diisocyanate, biphenyl-2,4'-diisocyanate, biphenyl-4,4'-diisocyanate, 3-3'-dimethylbiphenyl-4,4'-diisocyanate, 4,4'-diphenylmethane diisocyanate, 2,2'-diphenylmethane diisocyanate, and diphenylmethane-2,4-diisocyanate. These aromatic polyisocyanates may be used alone or in combination of two or more.

Examples of the method for producing the polyurethane (A) include a method in which the polyol, the aliphatic polyisocyanate and/or alicyclic polyisocyanate, an organic solvent, and, optionally, the chain extension agent are prepared and subjected to a urethanization reaction to thereby produce a solution of the polyurethane (A). Preferably, the reaction is performed, for example, at a temperature of 50 to 100° C. for 3 to 10 hours.

Examples of the organic solvent that can be used include N,N-dimethylformamide, N,N-dimethylacetamide, N-methyl-2-pyrrolidone, methyl ethyl ketone, methyl-n-propyl ketone, acetone, methyl isobutyl ketone, methyl formate, ethyl formate, propyl formate, methyl acetate, ethyl acetate, isopropyl acetate, isobutyl acetate, isobutyl acetate, secondary-butyl acetate, methanol, ethanol, isopropyl alcohol, and butanol. These organic solvents may be used alone or in combination of two or more. The amount of the organic solvent used is preferably within the range of 10 to 1,000 parts by mass and more preferably within the range of 20 to 600 parts by mass based on 100 parts by mass of the polyurethane (A).

From the viewpoint of production stability and mechanical strength, the ratio of the moles of isocyanate groups included in the aliphatic polyisocyanate and/or the alicyclic polyisocyanate to the total moles of hydroxyl groups and amino groups in the polyol and the chain extension agent [isocyanate groups/hydroxyl groups and amino groups] is preferably within the range of 0.8 to 1.2 and more preferably within the range of 0.9 to 1.1.

The weight average molecular weight of the polyurethane (A) can be appropriately determined within the range of 500 to 500,000 according to the intended physical properties. The weight average molecular weight of the polyurethane (A) is a value measured in the same manner as that for the number average molecular weight of the polyol.

Next, the hydrophilic monofunctional acrylate (b1) and the polyfunctional acrylate (2) will be described. In the present invention, it is essential to use the hydrophilic monofunctional acrylate (b1) and the polyfunctional acrylate (b2) in order to obtain excellent stain resistance. The hydrophilic monofunctional acrylate (1) allows a coating to have hydrophilicity that provides excellent stain resistance. The polyfunctional acrylate (b2) allows a semi-IPN structure to be formed, so that the stain resistance can be further improved.

The "hydrophilicity" of the hydrophilic monofunctional acrylate (b1) means affinity for water and specifically means a solubility in 100 g of water (20° C.) of preferably 5% by mass or more, more preferably 10% by mass or more, and still more preferably 20% by mass or more.

Examples of the hydrophilic monofunctional acrylate (b1) that can be used include an amido group-containing acrylic monomer (b1-1), an oxyethylene group-containing acrylic monomer (b1-2), a sulfonic acid group-containing acrylic monomer, a quaternary ammonium group-containing acrylic monomer, a carboxyl group-containing acrylic monomer, an amino group-containing acrylic monomer, a cyano group-containing acrylic monomer, a hydroxyl group-containing acrylic monomer, an imido group-containing acrylic monomer, and a methoxy group-containing acrylic monomer.

Examples of the amido group-containing acrylic monomer (b1-1) that can be used include (meth)acrylamide, (meth)acryloylmorpholine, N-methylol(meth)acrylamide, N-methoxyethyl(meth)acrylamide, N,N-dimethylacrylamide, N,N-diethylacrylamide, and N-isopropylacrylamide. These monomers may be used alone or in combination of two or more.

Examples of the oxyethylene group-containing acrylic monomer (b1-2) that can be used include polyethylene glycol (meth)acrylate and methoxypolyethylene glycol (meth)acrylate. These monomers may be used alone or in combination of two or more.

Examples of the sulfonic acid group-containing acrylic monomer that can be used include sodium sulfopropyl (meth)acrylate, sodium 2-sulfoethyl (meth)acrylate, and sodium 2-acrylamide-2-methylpropane sulfonate. These monomers may be used alone or in combination of two or more.

Examples of the quaternary ammonium group-containing acrylic monomer that can be used include tetrabutylammonium (meth)acrylate and trimethylbenzylammonium (meth) acrylate. These monomers may be used alone or in combination of two or more.

Examples of the carboxyl group-containing acrylic monomer that can be used include (meth)acrylic acid, propyl (meth)acrylic acid, isopropyl (meth)acrylic acid, crotonic acid, and fumaric acid. These monomers may be used alone or in combination of two or more.

Examples of the amino group-containing acrylic monomer that can be used include dimethylaminoethyl (meth) acrylate, diethylaminoethyl (meth)acrylate, N-tert-butylaminoethyl (meth)acrylate, and methacryloxyethyltrimethylammonium chloride (meth)acrylate. These monomers may be used alone or in combination of two or more.

Examples of the cyano group-containing acrylic monomer that can be used include acrylonitrile, cyanomethyl acrylate, 2-cyanoethyl acrylate, cyanopropyl acrylate, 1-cyanomethylethyl acrylate, 2-cyanopropyl acrylate, 1-cyanocyclopropyl acrylate, 1-cyanocycloheptyl acrylate, 1,1-dicyanoethyl acrylate, 2-cyanophenyl acrylate, 3-cyanophenyl acrylate, 4-cyanophenyl acrylate, 3-cyanobenzyl acrylate, and 4-cyanobenzyl acrylate. These monomers may be used alone or in combination of two or more.

Examples of the hydroxyl group-containing acrylic monomer that can be used include 2-hydroxyethyl (meth) acrylate, 2-hydroxypropyl (meth)acrylate, 2-hydroxybutyl (meth)acrylate, 4-hydroxybutyl (meth)acrylate, and glycerol mono(meth)acrylate. These monomers may be used alone or in combination of two or more.

Examples of the imido group-containing acrylic monomer that can be used include (meth)acrylic imide, N-methylolmaleimide, N-hydoxyethylmaleimide, N-glycidylmaleimide, N-4-chloromethylphenylmaleimide, and N-acetoxyethylmaleimide. These monomers may be used alone or in combination of two or more.

Examples of the methoxy group-containing acrylic monomer that can be used include 3-methoxybutyl (meth)acrylate), 2-methoxyethyl (meth)acrylate, 3-methoxypropyl (meth)acrylate, and 2-methoxybutyl (meth)acrylate. These monomers may be used alone or in combination of two or more.

Among the above monomers, the amido group-containing acrylic monomer (b1-1) and the oxyethylene group-containing acrylic monomer (b1-2) are preferably used as the hydrophilic monofunctional acrylate (b1) because they have a highly hydrophilic amido group having an alkyl-substituted nitrogen atom or polyoxyethylene glycol in their side chain and therefore excellent stain resistance is obtained. The total amount of the amido group-containing acrylic monomer (b1-1) and the oxyethylene group-containing acrylic monomer (b1-2) in the hydrophilic monofunctional acrylate (1) is preferably 70% by mass or more, more preferably 80% by mass or more, and still more preferably 90% by mass or more.

The average number of moles of oxyethylene groups added to the oxyethylene group-containing acrylic monomer (b1-2) is preferably within the range of 5 to 13 moles and more preferably within the range of 8 to 10 moles from the viewpoint of stain resistance and water-swelling resistance.

Examples of the polyfunctional acrylate (b2) that can be used include ethylene glycol di(meth)acrylate, propylene glycol di(meth)acrylate, tetramethylene glycol di(meth) acrylate, trimethylolpropane di(meth)acrylate, polyethylene glycol di(meth)acrylate, hexamethylene glycol di(meth) acrylate, 1,6-hexanediol di(meth)acrylate, 1,9-nonanediol di(meth)acrylate, 1,10-decanediol di(meth)acrylate, ethoxylated bisphenol A di(meth)acrylate, propoxylated ethoxylated bisphenol A di(meth)acrylate, tricyclodecane dimethanol diacrylate, dipropylene glycol di(meth)acrylate, tripropylene glycol, di(meth)acrylate, polypropylene glycol di(meth)acrylate, polytetramethylene glycol di(meth)acrylate, trimethylolpropane tri(meth)acrylate, pentaerythritol di(meth)acrylate, pentaerythritol tri(meth)acrylate, pentaerythritol tetra(meth)acrylate, di(trimethylolpropane) di(meth)acrylate, di(trimethylolpropane) tri(meth)acrylate, di(trimethylolpropane) tetra(meth)acrylate, dipentaerythritol di(meth)acrylate, dipentaerythritol tri(meth)acrylate, dipentaerythritol tetra(meth)acrylate, dipentaerythritol penta (meth)acrylate, dipentaerythritol hexa(meth)acrylate, and tris(2-(meth)acryloyloxyethyl)isocyanurate. The "polyfunctional" means that at least two (meth)acryloyl groups are present and preferably means that 2 to 3 (meth)acryloyl groups are present.

Among the above acrylates, oxyalkylene group-containing acrylates are preferable as the polyfunctional acrylate (b2) because their amorphism allows excellent compatibility with the polyurethane (A) and flexibility to be obtained, and oxypropylene group-containing acrylates are more preferable.

The average number of moles of oxyalkylene groups added to the polyfunctional acrylate (b2) is preferably within the range of 2 to 10 moles and more preferably within the range of 2 to 4 moles from the viewpoint of compatibility with the polyurethane (A).

The polymerization ratio (molar ratio) of the hydrophilic monofunctional acrylate (b1) to the polyfunctional acrylate (b2) is preferably within the range of 99.5/0.5 to 90/10 and more preferably within the range of 99/1 to 95/5 because higher stain resistance can be obtained.

The polymerization ratio (molar ratio) between the amido group-containing acrylic monomer (b1-1), the oxyethylene group-containing acrylic monomer (b1-2), and the polyfunctional acrylate (b2) is preferably within the range of (b1-1)/(b1-2)/(b2)=50/49.5/0.5 to 89/1/10 and more preferably within the range of 70/29/1 to 88/7/5 because higher stain resistance can be obtained.

The total amount of the hydrophilic monofunctional acrylate (b1) and the polyfunctional acrylate (b2) is preferably within the range of 10 to 70 parts by mass and more preferably within the range of 20 to 50 parts by mass based on 100 parts by mass of the polyurethane (A) because higher stain resistance can be obtained.

If necessary, an additional radical polymerizable monomer may be used in combination with the hydrophilic monofunctional acrylate (1) and the polyfunctional acrylate (b2).

Examples of the additional radical polymerizable monomer that can be used include: aliphatic (meth)acrylates such as methyl (meth)acrylate, ethyl (meth)acrylate, propyl (meth)acrylate, isopropyl (meth)acrylate, butyl (meth)acrylate, sec-butyl (meth)acrylate, isobutyl (meth)acrylate, 2-ethylbutyl (meth)acrylate, n-pentyl (meth)acrylate, hexyl (meth)acrylate, 2-ethylhexyl (meth)acrylate, heptyl (meth) acrylate, n-octyl (meth)acrylate, nonyl (meth)acrylate, dodecyl (meth)acrylate, 3-methylbutyl (meth)acrylate, isooctyl (meth)acrylate, lauryl (meth)acrylate, tridecyl (meth)acrylate, stearyl (meth)acrylate, isostearyl (meth)acrylate, neopentyl (meth)acrylate, hexadecyl (meth)acrylate, and isoamyl (meth)acrylate; alicyclic (meth)acrylates such as isobornyl (meth)acrylate, cyclohexyl (meth)acrylate, and tetrahydrofurfuryl (meth)acrylate; aromatic (meth)acrylates such as benzyl (meth)acrylate, benzyl (meth)acrylate, phenoxyethyl (meth)acrylate, and phenyl (meth)acrylate; and vinyl compounds such as styrene, α-methylstyrene, chlorostyrene, chloromethylstyrene, methyl vinyl ether, ethyl vinyl ether, and isobutyl vinyl ether. These monomers may be used alone or in combination of two or more.

A well-known radical polymerization method can be used to polymerize the hydrophilic monofunctional acrylate (1) and the polyfunctional acrylate (b2). In one exemplary method, the hydrophilic monofunctional acrylate (1), the polyfunctional acrylate (b2), a polymerization initiator, the optional additional radical polymerizable monomer, and an optional organic solvent are added to the solution of the polyurethane (A) and mixed and stirred or left to stand at a temperature within the range of, for example, 40 to 90° C. to allow radical polymerization to proceed for, for example, 1 to 20 hours.

Examples of the polymerization initiator that can be used include: peroxides such as hydrogen peroxide, potassium persulfate, sodium persulfate, and ammonium persulfate; organic peroxides such as benzoyl peroxide, t-butylperoxy-2-ethylhexanoate, and cumene hydroperoxide; and azo compounds such as 2,2'-azobis-(2-aminodipropane)dihydrochloride, 2,2'-azobis-(N,N'-dimethyleneisobutylamidine) dihydrochloride, azobisisobutyronitrile, 2,2'-azobis(2-methylbutyronitrile), and 2,2'-azobis(2,4-dimethylvaleronitrile). These polymerization initiators may be used alone or in combination of two or more. The amount of the polymerization initiator used is, for example, within the range of 0.001 to 5 parts by mass based on 100 parts by mass of the hydrophilic acrylic monomer (b1) and the polyfunctional acrylate (b2).

When the semi-IPN composite obtained by the above method is used to produce a skin or topcoat layer of a synthetic leather described later, additional additives may be used as needed.

Examples of the additional additives that can be used include a pigment, a flame retardant, a plasticizer, a softener, a stabilizer, a wax, an antifoaming agent, a dispersant, a penetrant, a surfactant, a filler, an antifungal agent, an antimicrobial agent, an ultraviolet absorber, an antioxidant, a weathering stabilizer, a fluorescent brightening agent, an anti-aging agent, and a thickener. These additives may be used alone or in combination of two or more.

Next, a method for producing a synthetic leather using the semi-IPN composite will be described.

Examples of the method for producing the moisture-permeable film include a method including applying the semi-IPN composite to release paper or a topcoat layer formed on the release paper, drying the applied semi-IPN composite at a temperature within the range of, for example, 40 to 150° C. for, for example, 1 to 30 minutes, and bonding the dried product to an intermediate or skin layer of the synthetic leather using a well-known adhesive.

Examples of the method for applying the semi-IPN composite to the release paper include a gravure coater method, a knife coater method, a pipe coater method, and a comma coater method.

The thickness of the dried product of the semi-IPN composite can be determined according to its intended application and is within the range of, for example, 0.01 to 10 mm.

The semi-INP composite obtained by the production method of the present invention is excellent in stain resistance. Therefore, the semi-IPN composite can be used preferably for the skin and topcoat layers of synthetic leathers and can be used particularly preferably for the skin and topcoat layers of synthetic leathers for vehicles.

EXAMPLES

The present invention will next be described in more detail by way of Examples.

Example 1

A reactor equipped with a stirrer, a thermometer, and a nitrogen gas introduction tube was charged with 100 parts by mass of an N,N-dimethylformamide solution of a polycarbonate-based urethane prepared using isophorone diisocyanate as a raw material ("CRISVON NY-393" manufactured by DIC Corporation, solid content: 25% by mass, hereinafter abbreviated as "alicyclic Pu1"), 2.97 parts by mass of N,N-dimethylacrylamide (hereinafter abbreviated as "DMAA"), 4.53 parts by mass of methoxypolyethylene glycol acrylate ("AM-90G" manufactured by Shin Nakamura Chemical Co., Ltd., average number of moles of oxyethylene groups added: 9 moles), and 0.68 parts by mass of tripropylene glycol diacrylate ("APG-200" manufactured by Shin Nakamura Chemical Co., Ltd.) (polymerization ratio (molar ratio) between DMAA/AM-90G/APG-200: 71/24/5, all figures rounded to the nearest integer), and then an azo-based polymerization initiator "V-601" manufactured by Wako Pure Chemical Industries, Ltd. was added in an amount of 2% by mass relative to the total amount of the monomers. These were mixed uniformly and then left to stand at 60° C. for 15 hours to allow radical polymerization to proceed, and a semi-IPN composite was thereby obtained.

Example 2

A reactor equipped with a stirrer, a thermometer, and a nitrogen gas introduction tube was charged with 100 parts by mass of an N,N-dimethylformamide solution of a polycarbonate-based urethane prepared using isophorone diisocyanate as a raw material ("CRISVON NY-331" manufactured by DIC Corporation, solid content: 25% by mass, hereinafter abbreviated as "alicyclic-based Pu2"), 2.97 parts by mass of DMAA, 4.53 parts by mass of AM-90G, and 0.68 parts by mass of APG-200 (polymerization ratio (molar ratio) between DMAA/AM-90G/APG-200: 71/24/5, all figures rounded to the nearest integer), and then the azo-based polymerization initiator "V-601" manufactured by Wako Pure Chemical industries, Ltd. was added in an amount of 2% by mass relative to the total amount of the monomers. These were mixed uniformly and then left to stand at 60° C. for 15 hours to allow radical polymerization to proceed, and a semi-IPN composite was thereby obtained.

Example 3

A reactor equipped with a stirrer, a thermometer, and a nitrogen gas introduction tube was charged with 100 parts by mass of the alicyclic-based Pu1, 2.97 parts by mass of DMAA, 4.53 parts by mass of AM-90G, and 0.08 parts by mass of APG-200 (polymerization ratio (molar ratio) between DMAA/AM-90G/APG-200: 74/25/1, all figures rounded to the nearest integer), and then the azo-based polymerization initiator "V-601" manufactured by Wako Pure Chemical industries, Ltd. was added in an amount of 2% by mass relative to the total amount of the monomers. These were mixed uniformly and then left to stand at 60° C. for 15 hours to allow radical polymerization to proceed, and a semi-IPN composite was thereby obtained.

Example 4

A reactor equipped with a stirrer, a thermometer, and a nitrogen gas introduction tube was charged with 100 parts by mass of the alicyclic-based Pu1, 4.95 parts by mass of DMAA, 7.55 parts by mass of AM-90G, and 1.13 parts by mass of APG-200 (polymerization ratio (molar ratio) between DMAA/AM-90G/APG-200: 71/24/5, all figures rounded to the nearest integer), and then the azo-based polymerization initiator "V-601" manufactured by Wako Pure Chemical Industries, Ltd. was added in an amount of 2% by mass relative to the total amount of the monomers. These were mixed uniformly and then left to stand at 60° C. for 15 hours to allow radical polymerization to proceed, and a semi-IPN composite was thereby obtained.

Example 5

A reactor equipped with a stirrer, a thermometer, and a nitrogen gas introduction tube was charged with 100 parts by mass of the alicyclic-based Pu1, 2.30 parts by mass of DMAA, 5.20 parts by mass of methoxypolyethylene glycol acrylate ("AM-130G" manufactured by Shin Nakamura Chemical Co., Ltd., average number of moles of oxyethylene groups added: 13 moles), and 0.45 parts by mass of APG-200 (polymerization ratio (molar ratio) between DMA/AM-130G/APG-200: 71/24/5, all figures rounded to the nearest integer), and then the azo-based polymerization initiator "V-601" manufactured by Wako Pure Chemical Industries, Ltd. was added in an amount of 2% by mass relative to the total amount of the monomers. These were mixed uniformly and then left to stand at 60° C. for 15 hours to allow radical polymerization to proceed, and a semi-IPN composite was thereby obtained.

Example 6

A reactor equipped with a stirrer, a thermometer, and a nitrogen gas introduction tube was charged with 100 parts by mass of the alicyclic-based Pu1, 2.97 parts by mass of DMAA, 4.53 parts by mass of AM-90G, and 1.05 parts by mass of polypropylene glycol #400 diacrylate ("APG-400" manufactured by Shin Nakamura Chemical Co., Ltd., average number of moles of oxypropylene groups added: 7 moles) (polymerization ratio (molar ratio) between DMAA/AM-90G/APG-400: 71/24/5, all figures rounded to the nearest integer), and then the azo-based polymerization initiator "V-601" manufactured by Wako Pure Chemical Industries, Ltd. was added in an amount of 2% by mass relative to the total amount of the monomers. These were mixed uniformly and then left to stand at 60° C. for 15 hours to allow radical polymerization to proceed, and a semi-IPN composite was thereby obtained.

Comparative Example 1

A reactor equipped with a stirrer, a thermometer, and a nitrogen gas introduction tube was charged with 100 parts by mass of an N,N-dimethylformamide solution of a polyester-based urethane prepared using diphenylmethane diisocyanate as a raw material ("CRISVON MP-856" manufactured by DIC Corporation, solid content: 20% by mass, hereinafter abbreviated as "aromatic-based Pu"), 2.37 parts by mass of DMA, 3.63 parts by mass of AM-90G, and 0.54 parts by mass APG-200 (polymerization ratio (molar ratio) between DMAA/AM-90G/APG-400: 71/24/5, all figures rounded to the nearest integer), and then the azo-based polymerization initiator "V-601" manufactured by Wako Pure Chemical industries, Ltd. was added in an amount of 2% by mass relative to the total amount of the monomers. These were mixed uniformly and then left to stand at 60° C. for 15 hours to allow radical polymerization to proceed, and a semi-IPN composite was thereby obtained.

Comparative Example 2

The alicyclic-based Pu1 alone was subjected to the following evaluation tests.

Comparative Example 3

The alicyclic-based Pu2 alone was subjected to the following evaluation tests.

Method for Evaluating Contact Angle

One of the above polyurethane solutions and the semi-IPN composites obtained in the Examples and Comparative Examples was applied to glass to a dry thickness of 15 μm and dried at 70° C. for 2 minutes and then at 120° C. for 2 minutes using a dryer to thereby produce a test piece, and its water contact angle was measured using "DropMaster 700" (a solid-liquid interface analysis system option) with a temperature measurement unit (DM) manufactured by Kyowa Interface Science Co., Ltd.

Method for Evaluating Stain Resistance

One of the above polyurethane solutions and the semi-IPN composites obtained in the Examples and Comparative Examples was applied to a skin layer of a synthetic leather to a dry thickness of 5 μm and dried at 70° C. for 2 minutes and then at 120° C. for 2 minutes using a dryer to obtain a coated piece.

The coated piece obtained was applied to a friction surface of a Gakushin-type abrasion tester, and a black soiled test fabric ("EMPA104" manufactured by Swissatest) was applied to a friction block. Then a reciprocating test was repeated 100 times under a load of 1 kg. Then the test piece was wiped with BEMCOT wetted with pure water and evaluated as to whether the black soil was present or absent as follows.

"Good": The black soil was wiped off completely.
"Fair": The black soil remained partially.
"Poor": The black soil was not wiped off at all.

TABLE 1

|  | Example 1 | Example 2 | Example 3 | Example 4 | Example 5 | Example 6 | Comp. Example 1 | Comp. Example 2 | Comp. Example 3 |
|---|---|---|---|---|---|---|---|---|---|
| Polyurethane (A) | Alicyclic Pu1 | Alicyclic Pu2 | Alicyclic Pu1 | Alicyclic Pu1 | Alicyclic Pu1 | Alicyclic Pu1 | Aromatic Pu | Alicyclic Pu1 | Alicyclic Pu2 |
| Hydrophilic monofunctional acrylate (b1) |  |  |  |  |  |  |  |  |  |
| Amido group-containing acrylic monomer (b1-1) | DMAA | DMAA | DMAA | DMAA | DMAA | DMAA | DMAA |  |  |
| Oxyethylene group-containing acrylic monomer (b1-2) | AM-90G | AM-90G | AM-90G | AM-90G | AM-130G | AM-90G | AM-90G |  |  |
| Amount of (b1) used based on 100 parts by mass of (A) (parts by mass) | 30 | 30 | 30 | 50 | 30 | 30 | 30 |  |  |
| Polyfunctional acrylate (b2) | APG-200 | APG-200 | APG-200 | APG-200 | APG-200 | APG-400 | APG-200 |  |  |
| Amount of (b2) used based on 100 parts by mass of (A) (parts by mass) | 2.72 | 2.72 | 0.32 | 4.52 | 1.8 | 4.2 | 2.72 |  |  |
| Molar ratio ((b1-1)/(b1-2)/(b2)) | 71/24/5 | 71/24/5 | 74/25/1 | 71/24/5 | 71/24/5 | 71/24/5 | 71/24/5 |  |  |
| Contact angle | 15° | 18° | 18° | 13° | 20° | 22° | 50° | 70° | 69° |
| Evaluation of stain resistance | Good | Good | Good | Good | Good | Good | Fair | Poor | Poor |

As can be seen, in Examples 1 to 6, each of which provides the semi-IPN composite of the present invention, the water contact angle was small, and the coating was hydrophilic, so that excellent stain resistance was obtained.

In Comparative Example 1, the aromatic polyurethane was used, and the stain resistance of the semi-IPN composite obtained was not good.

In Comparative Examples 2 and 3, the coated pieces were formed using commonly used polyurethanes, and therefore the stain resistance was poor.

The invention claimed is:

1. A method for producing a semi-IPN composite, the method comprising polymerizing a hydrophilic monofunctional acrylate (b1) and a polyfunctional acrylate (b2) in a solution of a polyurethane (A) prepared using an aliphatic polyisocyanate and/or an alicyclic polyisocyanate as a raw material,
    wherein the hydrophilic monofunctional acrylate (b1) comprises an amido group-containing acrylamide monomer (b1-1) and an oxyethylene group-containing acrylate monomer (b1-2), and
    wherein the polymerization ratio (molar ratio) between the amido group-containing acrylamide monomer (b1-1), the oxyethylene group-containing acrylate monomer (b1-2), and the polyfunctional acrylate (b2) is within the range of (b1-1)/(b1-2)/(b2)=50/49.5/0.5 to 89/1/10.

2. The method for producing a semi-IPN composite according to claim 1, wherein the polyfunctional acrylate (b2) has an oxyalkylene group.

3. The method for producing a semi-IPN composite according to claim 1, wherein the total amount of the hydrophilic monofunctional acrylate (b1) and the polyfunctional acrylate (b2) is within the range of 10 to 70 parts by mass based on 100 parts by mass of the polyurethane (A).

* * * * *